Patented Oct. 17, 1950

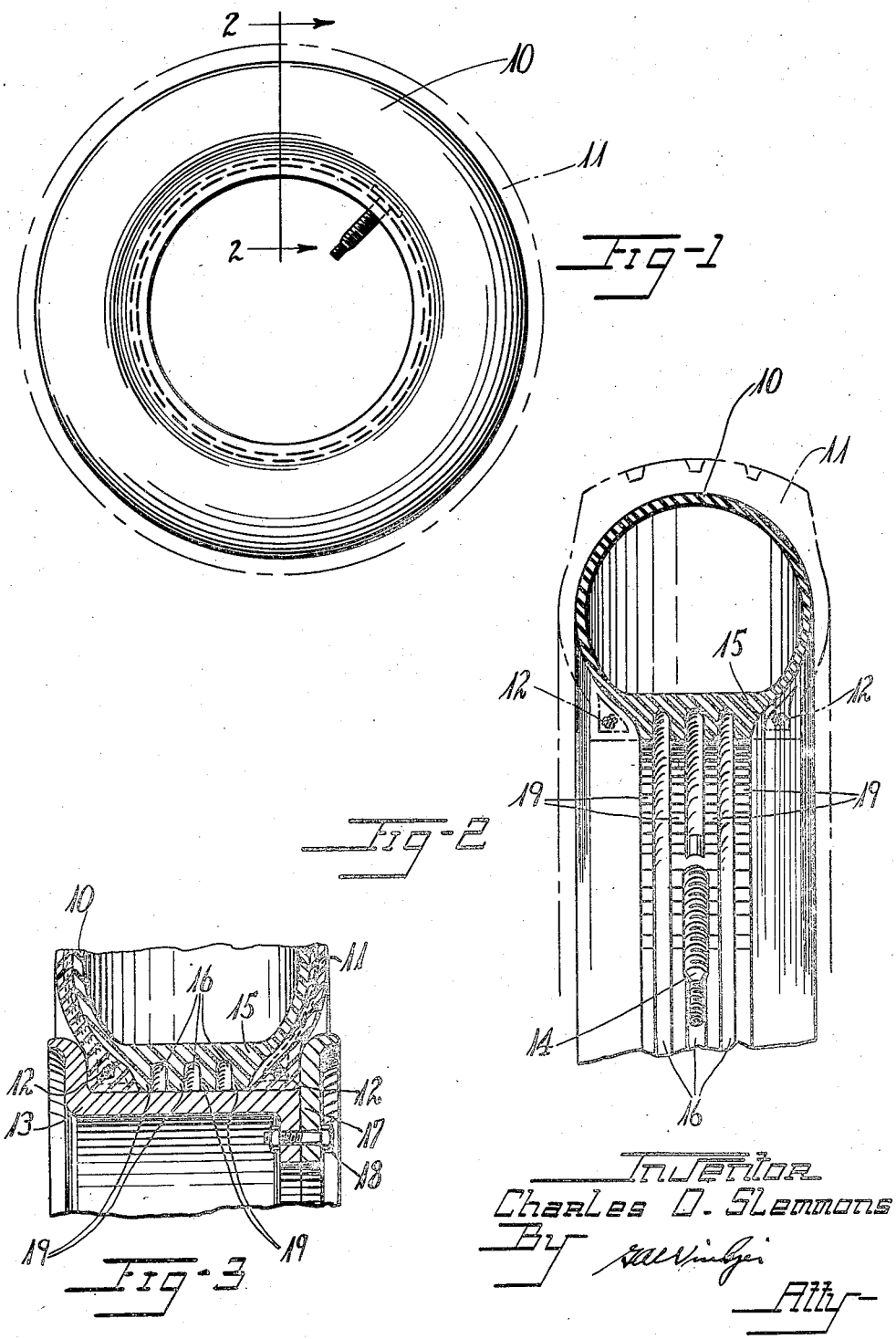

2,526,164

UNITED STATES PATENT OFFICE 2,526,164

LIQUID-FILLED TIRE

Charles O. Slemmons, South Bend, Ind., assignor to The B. F. Goodrich Company, New York, N. Y., a corporation of New York Application July 25, 1946, Serial No. 686,207

5 Claims. (Cl. 152—349)

This invention relates to liquid-filled tires such as are useful on vehicles of the tractor, farm-implement and low-speed industrial class, and especially to the construction of the tire assemblies and the inner tubes therefor.

Tires for vehicles of this class as used heretofore have been partially filled with liquid for the purpose of increasing traction and decreasing undesirable bouncing. The residual air in the tires is compressible and has acted to cushion the tires and vehicles. This cushioning action is lost, however, when the tires are completely filled with liquid to the exclusion of the air. The liquid of the completely filled tire has had substantially no compressibility in volume, and substantially all the tire cushioning has in this case depended upon the limited stretching of the casing walls.

Adequate cushioning is desirable as it improves the riding characteristics of the vehicles, relieves the tire casing of objectionable stresses and strains, and increases the service life of the tires. At the same time added weight, especially unsprung weight near the ground, is desirable to increase traction and reduce bouncing.

Objects of the invention are to make possible complete liquid-filling of the tire and at the same time to improve riding characteristics, to prolong the useful life of tires, to provide effective cushioning and to provide for simplicity of structure and convenience of procedure in obtaining these results.

These and further objects will appear from the following description, reference being had to the accompanying drawings in which:

Fig. 1 is an elevation of an inner tube constructed according to and embodying the invention, a surrounding tire casing being indicated in broken lines.

Fig. 2 is an enlarged section taken along line 2—2 of Fig. 1, parts being broken away.

Fig. 3 is a partial section of the inner tube, tire casing and rim assembly embodying the invention.

In the embodiment of the invention shown in the drawings, an inflatable inner tube 10, in the form of a hollow generally toroidal body, of resilient rubber or other rubber-like material, constructed as hereinafter more fully described, is mounted in a tire casing 11 open at the inner periphery and having bead portions 12 embedded in the edges. This assembly is mounted on a rim 13 of a vehicle wheel. A demountable flange 17 may be mounted on the rim 13 by bolts 18 to facilitate mounting of the tire on the rim 13. A valve stem 14 is mounted on the inner tube 10 for conducting fluids such as water and air into the inner tube 10.

A base portion 15 of the inner tube 10 at the rim-side is provided with a cushioning portion preferably integrally formed with the body of the inner tube 10. If desired, the base portion 15 of the inner tube 10 may be supplied as an independent piece or pieces. The cushioning portion of the tube 10 is provided with recesses 16 in which the material of the inner tube 10 may be displaced when subjected to forces transmitted to it by the liquid contained in the inner tube 10.

The recesses 16 may be of any suitable shape and in the illustrated embodiment of the invention the recesses 16 comprise annular channels between circumferentially extending ribs 19 in the surface of the inner tube 10 which abuts the rim 13. Under vehicle loads the ribs 19 serve in the manner of compression columns in the radial direction to transmit forces from the liquid to the rim 13. Under impacts such as may be caused by irregularities in the terrain over which the wheel is rolling, the ribs are compressed to a greater degree and the resilient rubber-like material of which they are composed is displaced into the recesses 16. The compression and deformation of the ribs 19 supplies a resilient cushioning action. The cushioning portion of the inner tube is mounted between the beads 12 of the tire casing 11 which provide lateral support to the cushioning portion and confine the stresses imposed upon the ribs 19 to compression by preventing undesirable bending and folding of the ribs.

In operation, with the tire mounted upon the rim 13 of a wheel of a vehicle passing over rough ground forces imposed upon the tire casing 11 are transmitted to the body of liquid contained in the inner tube 10. The liquid will not be compressed appreciably but will transmit the resultant forces in all directions to those portions of the inner tube 10 wall abutting the tire casing 11 and to the base portion 15. A considerable part of the force is cushioned by the base portion 15 which cushions by stressing the ribs 19 of rubber-like material of the base portion in compression. Recesses 16 in the base portion of the tube provide space for resilient displacement and deformation of the ribs 19 to accommodate the compression and provide for the desired cushioning deflection.

The improved inner tube 10 makes possible the use of tires completely filled with liquid and thereby attains greater traction with the greater weight, prolongs the life of the tire casing 11 and improves the riding qualities of the vehicle.

Variations may be made without departing from the invention as it is defined in the following claims.

I claim:

1. A tire and rim assembly comprising a tire casing open at the inner periphery, a rim, an inner tube of resilient material in said casing having integral with said inner tube a base portion constituting a portion of the wall of said inner tube and being seated upon said rim, and a body of liquid substantially completely filling said tube, said base portion being formed with recesses extending part way therein from the rim-side face thereof and distributed across said face with intervening portions of the resilient material for cushioning forces transmitted through said tire casing and said body of liquid to said base portion.

2. A tire and rim assembly comprising a tire casing open at the inner periphery, a rim, an inner tube in said casing, a body of liquid substantially completely filling said tube and said tube having integral with said tube a base portion at the rim side periphery of said inner tube with circumferentially extending ribs of resilient material on the rim-side face of said portion for cushioning forces transmitted through said tire casing and said body of liquid to said base portion.

3. A tire and rim assembly comprising a rim, a tire casing open at its inner periphery and having bead portions in the edges, an inner tube in said casing of resilient rubber-like material having a base portion integral therewith at the inner periphery seated upon said rim between said bead portions, a body of liquid in said inner tube filling the same substantially completely, said base portion having a greater wall thickness than other portions of said inner tube and formed with axially spaced-apart circumferentially-extending ribs abutting said rim and separating intervening grooves into which the ribs are distortable to provide a cushion between said rim and said body of liquid.

4. An inner tube for a rim-mounted completely liquid-filled tire, said inner tube comprising a hollow toroidal body of resilient rubber-like material, including a base portion at the rim-side periphery of said body integral therewith, said base portion having circumferentially extending ribs of said rubber-like material in the rim side face of said portion and intervening circumferentially extending channels, said ribs providing supporting columns distortable into said channels providing a cushion between the interior of the inner tube and the rim side face thereof.

5. An inner tube suitable for complete liquid-filling in a rim-mounted tire, said inner tube comprising a hollow toroidal body of rubber-like material having as an integral part thereof at its rim-side periphery a base portion of the resilient material constituting a portion of the wall of said body and being relatively thick as compared to the remaining wall of the body, said base portion having recesses extending part way therein from the rim-side face thereof and distributed across said face and intervening masses of the resilient material providing support for transmitting forces from the liquid within the body and providing cushioning action by distortion of the resilient material into said spaces.

CHARLES O. SLEMMONS.

REFERENCES CITED

The following references are of record in the file of this patent:

UNITED STATES PATENTS

| Number | Name | Date |
| --- | --- | --- |
| 574,446 | Northrop | Jan. 5, 1897 |
| 1,156,155 | Landis | Oct. 12, 1915 |
| 1,252,107 | Haigler | Jan. 1, 1918 |
| 1,614,286 | Cullen | Jan. 11, 1927 |
| 1,621,021 | Medynski | Mar. 15, 1927 |
| 2,222,047 | Snyder | Nov. 19, 1940 |